United States Patent
Park et al.

(10) Patent No.: US 11,715,601 B2
(45) Date of Patent: Aug. 1, 2023

(54) CASE MOLDING CAPACITOR HAVING IMPROVED HORIZONTAL DEGREE

(71) Applicant: NUINTEK CO LTD, Chungcheongnam-do (KR)

(72) Inventors: Dae-Jin Park, Chungcheongnam-do (KR); Ying-Won Jeon, Chungcheongnam-do (KR); Jin-A Park, Chungcheongnam-do (KR); Hyeon-Jin Kim, Chungcheongnam-do (KR); Taek-Hyeon Lee, Chungcheongnam-do (KR)

(73) Assignee: NUINTEK CO LTD, Chungcheongnam-do (KR)

( * ) Notice: Subject to any disclaimer, the term of this patent is extended or adjusted under 35 U.S.C. 154(b) by 0 days.

(21) Appl. No.: 17/788,981

(22) PCT Filed: Jun. 29, 2021

(86) PCT No.: PCT/KR2021/008162
§ 371 (c)(1),
(2) Date: Jun. 24, 2022

(87) PCT Pub. No.: WO2022/124505
PCT Pub. Date: Jun. 16, 2022

(65) Prior Publication Data
US 2023/0059398 A1 Feb. 23, 2023

(30) Foreign Application Priority Data
Dec. 10, 2020 (KR) .......... 10-2020-0171851

(51) Int. Cl.
*H01G 4/224* (2006.01)
*H01G 2/08* (2006.01)

(52) U.S. Cl.
CPC .......... *H01G 4/224* (2013.01); *H01G 2/08* (2013.01)

(58) Field of Classification Search
CPC .......... H01G 4/224; H01G 2/08; H01G 4/38
See application file for complete search history.

(56) References Cited

U.S. PATENT DOCUMENTS

2011/0090614 A1* 4/2011 Guerin .......... H01G 11/78 361/274.3
2011/0149472 A1* 6/2011 Yang .......... H01G 4/38 29/25.41

(Continued)

FOREIGN PATENT DOCUMENTS

CN 108701541 A * 10/2018 .......... H01G 2/04
KR 100896004 B1 * 5/2009

(Continued)

OTHER PUBLICATIONS

International Search Report from corresponding PCT Application No. PCT/KR2021/008162, dated Oct. 25, 2021.

*Primary Examiner* — Dion R. Ferguson
(74) *Attorney, Agent, or Firm* — Harness, Dickey & Pierce, P.L.C.

(57) ABSTRACT

The present disclosure relates to a case molding including: a plastic case having an accommodation chamber formed by four sides and a bottom to accommodate the capacitor module, and having an open side on the top for filling a molding agent; a capacitor module including a capacitor device, a first busbar electrically connected with a thermally-sprayed surface of the capacitor device, a second busbar electrically connected with the other thermally-sprayed surface of the capacitor, and an insulating sheet disposed between the first busbar and the second busbar; a filler permeating in a gel or fluid state into the space between the capacitor module and inner walls of the plastic case, and (Continued)

(a) PLASTIC CASE (b) HORIZONTAL PLATE PART then hardened therein; and a horizontal plate part positioned over the capacitor module and the filler, and has a horizontal plate integrated thereto with the bottom pressing the filler.

8 Claims, 11 Drawing Sheets

(56) References Cited

U.S. PATENT DOCUMENTS

| | | | |
|---|---|---|---|
| 2017/0062134 A1* | 3/2017 | Koyama | H01G 4/38 |
| 2017/0148570 A1* | 5/2017 | Park | H01G 4/224 |
| 2023/0039264 A1* | 2/2023 | Park | H02G 5/005 |
| 2023/0053806 A1* | 2/2023 | Park | H01G 4/40 |
| 2023/0059398 A1* | 2/2023 | Park | H01G 4/12 |

FOREIGN PATENT DOCUMENTS

| | | | |
|---|---|---|---|
| KR | 10-2011-0086385 A | | 7/2011 |
| KR | 10-2011-0101454 A | | 9/2011 |
| KR | 20110101454 A | * | 9/2011 |
| KR | 10-2015-0078663 A | | 7/2015 |
| KR | 10-2015-0080399 A | | 7/2015 |
| KR | 10-2015-0092693 A | | 8/2015 |

\* cited by examiner

FIG. 1a

FIG. 1b (a) PLASTIC CASE (b) HORIZONTAL PLATE PART

FIG. 2a (a) PLASTIC CASE (b) HORIZONTAL PLATE PART

* SHAPE EXAMPLE OF STRUCTURE IN WHICH HORIZONTAL PLATE PLATE BAR BAR IS NOT PULLED OUT BECAUSE MOLDING AGENT COMES IN HORIZONTAL

FIG. 4a

* SHAPE EXAMPLE OF STRUCTURE IN WHICH HORIZONTAL PLATE BAR IS NOT PULLED OUT BECAUSE MOLDING AGENT COMES IN HORIZONTAL PLATE BAR

CASE MOLDING CAPACITOR HAVING IMPROVED HORIZONTAL DEGREE

CROSS-REFERENCE TO RELATED APPLICATIONS

This application is a national phase application of PCT Application No. PCT/KR2021/008162, filed on 29 Jun. 2021, which claims priority to Korean Patent Application No. 10-2020-0171851, filed on 10 Dec. 2020. The entire disclosures of the applications identified in this paragraph are incorporated herein by references.

FIELD OF THE INVENTION

The present disclosure relates to a case molding capacitor having an improved horizontal degree.

DESCRIPTION OF THE RELATED ART

In general, film capacitors are generally used in various industrial fields, and for example, a capacitor for electric devices, a low-voltage power capacitor, a capacitor for an inverter, a capacitor for a filter, etc. are well known.

In order to manufacture these capacitors, a dielectric film (or also called a plastic film) such as polyester (PET) resin, polypropylene (PP) resin, polyethylene naphthalene (PEN) resin, polycarbonate (PC) resin, polyphenylene sulfide (PPS) resin is used as a dielectric, and a deposited film formed by depositing zinc, aluminum, or an aluminum alloy or primarily depositing aluminum and then secondarily using zinc, etc. on one side or both sides of a dielectric film is used as an electrode.

A film capacitor is manufactured by winding two sheets of deposited films making a pair. In order to use both sides of a wound capacitor device for leading electrodes, thermally-sprayed surfaces are formed by thermally spraying zinc or a zinc alloy to both sides of the capacitor device, busbars, electrode leads, or electrode terminals are coupled to the thermally-sprayed surfaces through spotting, solder, etc., the capacitor device is inserted into an external case, and then an insulator such as epoxy or urethane is put into the external case and then cured, whereby the capacitor device can be manufactured as a case mold type capacitor. As related technologies in this field, there are Korean Patent No. 10-2168406, etc.

The related art and problems are as follows.

1) Existing capacitors were manufactured by cooing the bottom and the PPS case surface that are sides of the capacitor.

2) Five sides (the top, the bottom, the left and right sides, and the rear) of a total of six sides of a capacitor are plastic PPS cases, and the other one side is an epoxy resin side so that a capacitor module unit can be inserted, an outlet busbar can be led out, and epoxy resin can be filled.

3) Five sides of a total of six sides of the capacitor are composed of plastic PPS and thermal conductivity of the PPS is 0.359Wm^-1C^-1, and the other one side is made of epoxy resin and thermal conductivity of the epoxy resin is 0.6Wm^-1C^-1. 4) When the capacitor is cooled while an inverter power conversion element IGBT is pressed by an epoxy resin surface, the thermal conductivity is improved by about 40.2%, so it is possible to increase the lifespan by decreasing a capacitor Hotspot temperature and to reduce capacity of the capacitor. Accordingly, there is an advantage that it is possible to reduce the volume and the weight of the capacitor, but there is a reason that this advantage is not used up to now.

5) The reason is that epoxy resin is put in a hardening furnace and hardened therein, but the horizontal degree of a hardening furnace oven for mass production is within ±0.5 mm and the average is ±2 mm. That is, it is advantageous that a filling surface and a cooling surface are in contact with each other in terms of heat transfer to cool an inverter power conversion element IGB cooling unit for a vehicle, but the horizontal degree of the filling surface is poor, so there is problem that a surface contact ratio is lower and heat transfer is not sufficiently made.

It was difficult to give a horizontal degree of ±0.5 mm to all of furnaces 1, 2, 3, 4, and 5 in a way of the left and right sides of the front and the left and right sides of the rear of a hardening furnace for mass production using the method of filling epoxy resin in one side of six sides of a capacitor (existing method). There was limitation in facilities.

A metal plate bar pressing a power switch IGBT is attached to a capacitor epoxy resin surface, and heat sink+IGBT+heat sink (IGBT cooling unit or IGBT unit) are assembled in this order, so the horizontal degree of the capacitor epoxy resin surface is not uniform. Accordingly, the metal plate bar is not pressed by a uniform surface, so there is a problem that IGBT cooling is not made in a non-contact portion of the heat sink and the IGBT.

When cooling performance decreases in this way and a mount is more strongly bolted to improve contact force, there is a problem that the capacitor mount is damaged.

SUMMARY OF THE INVENTION

The present disclosure provides a case molding capacitor having an improved horizontal degree in which heat dissipation by direct contact of a filling surface and an IGBT cooling unit can be increased because it is difficult to make the horizontal degree or levelness of an epoxy exposure surface be ±0.5 mm while using the epoxy filling hardening method of the present disclosure.

A case molding capacitor having an improved horizontal degree of the present disclosure includes: a plastic case (10) having an accommodation chamber formed by four sides and a bottom to accommodate the capacitor module, and having an open side (11) on the top for filling a molding agent; a capacitor module (20) including a capacitor device (C) formed by winding a dielectric film and having thermally-sprayed surfaces on both sides, a first busbar electrically connected with a thermally-sprayed surface of the capacitor device (C) and having a first lead terminal (21) on an exposed side, a second busbar electrically connected with the other thermally-sprayed surface of the capacitor device and having a second lead terminal (22) on an exposed side, and an insulating sheet disposed between the first busbar and the second busbar to insulate an overlap region, and being accommodated in the accommodation chamber of the plastic case (10); a filler (30) permeating in a gel or fluid state into the space between the capacitor module (20) and inner walls of the plastic case (10), and then hardened therein, thereby filling up the space; a horizontal plate part (40) positioned over the capacitor module (20) and the filler (30, has a shape corresponding to the contour of the open side (11), and has a horizontal plate (41) integrated thereto with the bottom pressing the filler (30).

According to the present disclosure, there is provided a case molding capacity having an improved horizontal degree in which heat dissipation by direct contact of a filling surface and an IGBT cooling unit can be increased because it is difficult to make the horizontal degree or levelness of an epoxy exposure surface be ±0.5 mm while using the epoxy filling hardening method of the present disclosure.

DETAILED DESCRIPTION OF THE INVENTION

A case molding capacitor having an improved horizontal degree of the present disclosure includes: a plastic case (10) having an accommodation chamber formed by four sides and a bottom to accommodate the capacitor module, and having an open side (11) on the top for filling a molding agent; a capacitor module (20) including a capacitor device (C) formed by winding a dielectric film and having thermally-sprayed surfaces on both sides, a first busbar electrically connected with a thermally-sprayed surface of the capacitor device (C) and having a first lead terminal (21) on an exposed side, a second busbar electrically connected with the other thermally-sprayed surface of the capacitor device and having a second lead terminal (22) on an exposed side, and an insulating sheet disposed between the first busbar and the second busbar to insulate an overlap region, and being accommodated in the accommodation chamber of the plastic case (10); a filler (30) permeating in a gel or fluid state into the space between the capacitor module (20) and inner walls of the plastic case (10), and then hardened therein, thereby filling up the space; a horizontal plate part (40) positioned over the capacitor module (20) and the filler (30, has a shape corresponding to the contour of the open side (11), and has a horizontal plate (41) integrated thereto with the bottom pressing the filler (30).

Figure 1A:
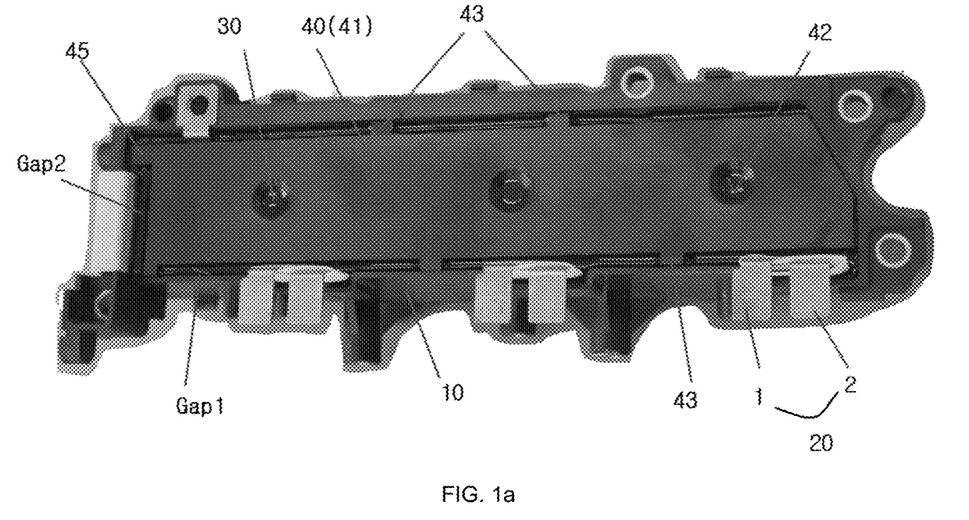
FIGS. 1a and 1b are an assembly state view of a case molding capacitor having an improved horizontal degree according to an embodiment of the present disclosure.
Figure 1B:
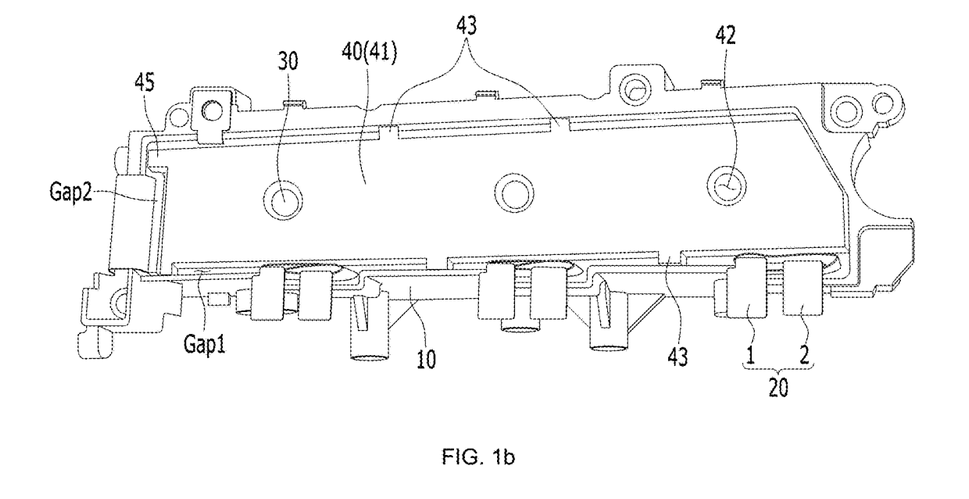
Figure 3A:
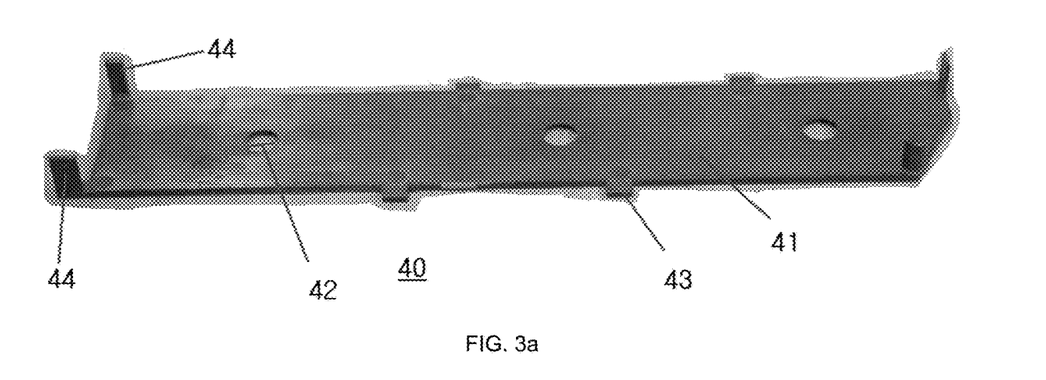
FIGS. 3a and 3b are a rear perspective view of a horizontal plate part of the case molding capacitor having an improved horizontal degree of the present disclosure.
Figure 3B:
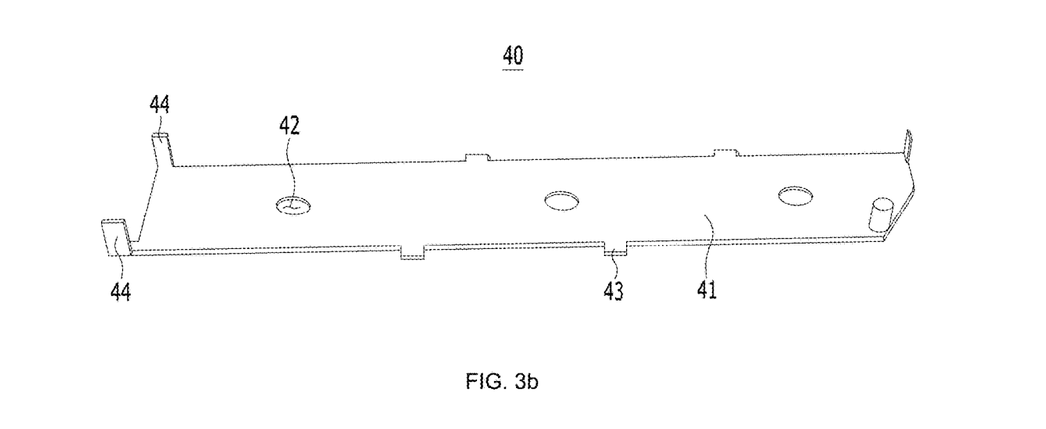
Figure 4A:
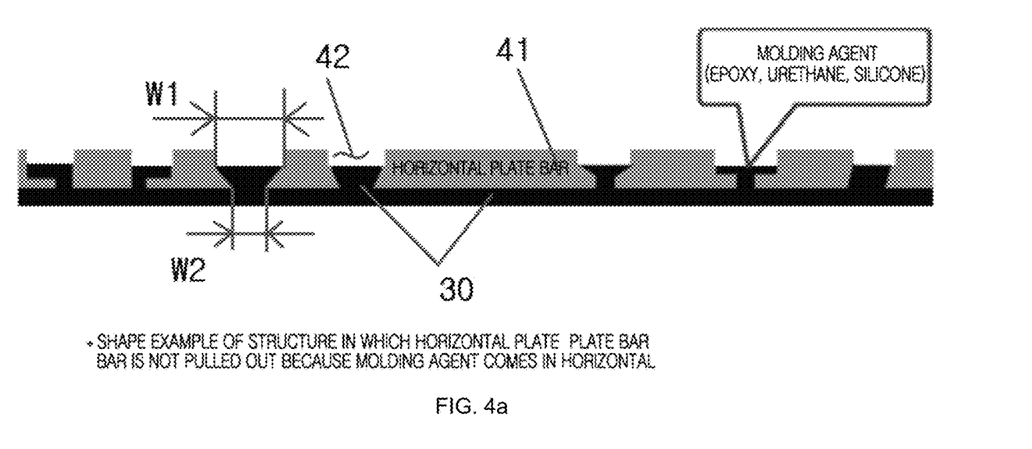
FIGS. 4a and 4b are a cross-sectional structural view of the horizontal plate part of the case molding capacitor having an improved horizontal degree of the present disclosure.
Figure 4B:
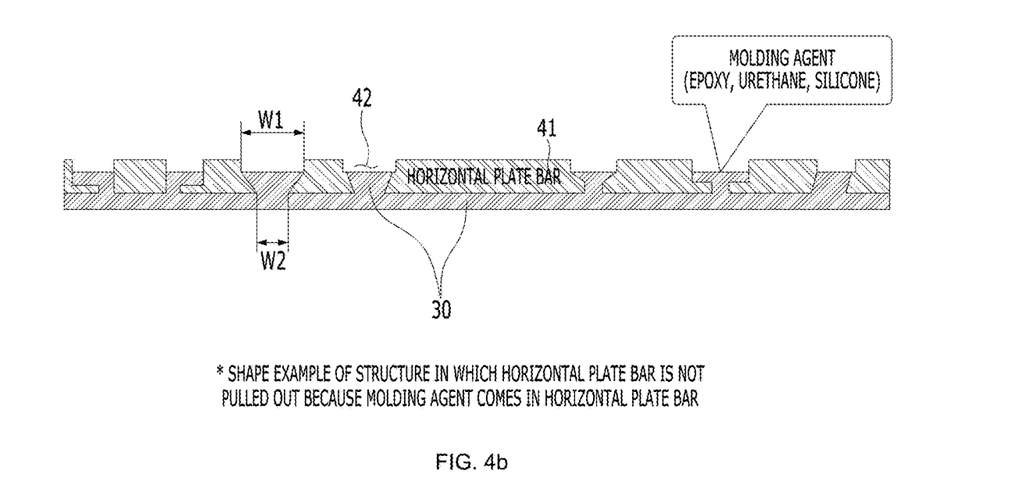
Figure 5A:
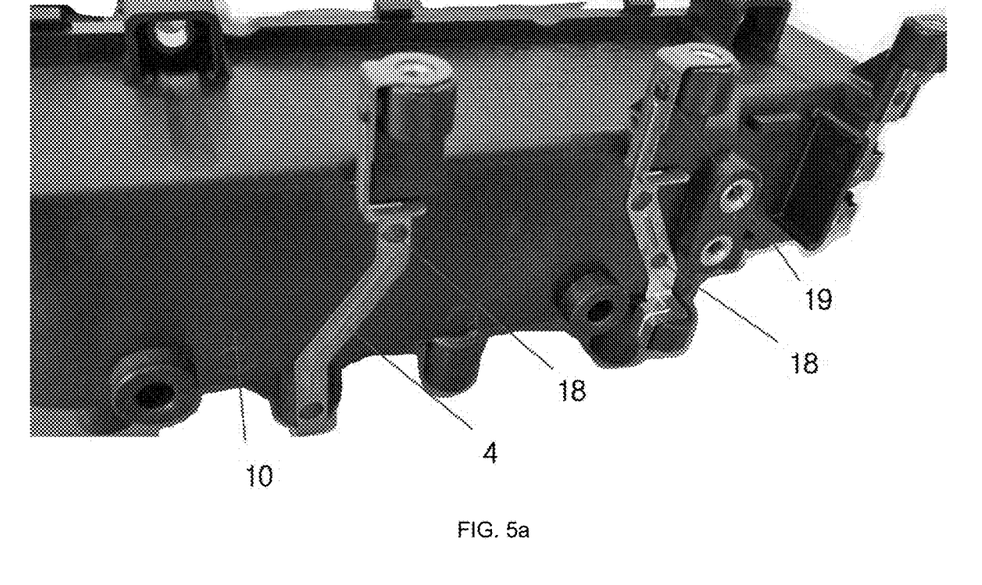
FIGS. 5a and 5b are a rear perspective view of the case molding capacitor having an improved horizontal degree of the present disclosure (busbar extension assembly view)
Figure 5B:
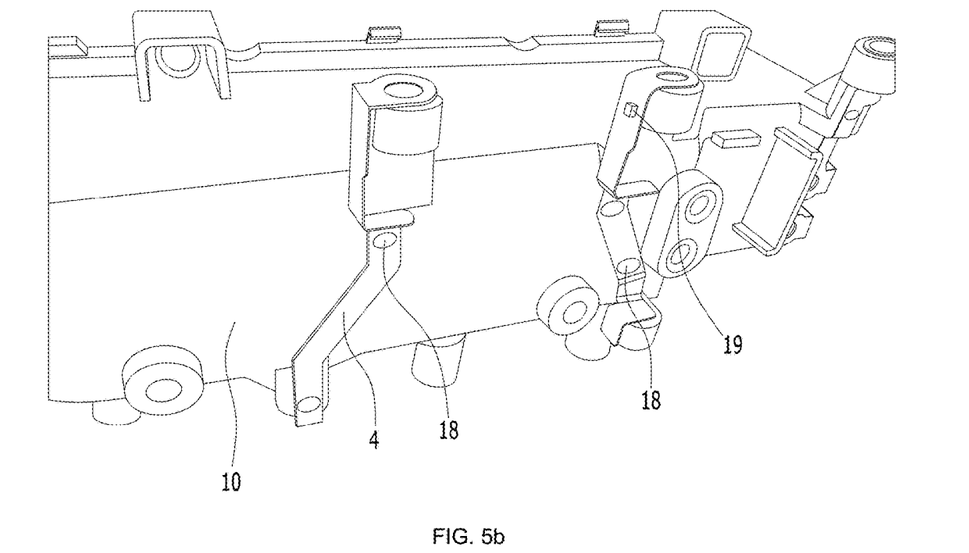
Figure 6:
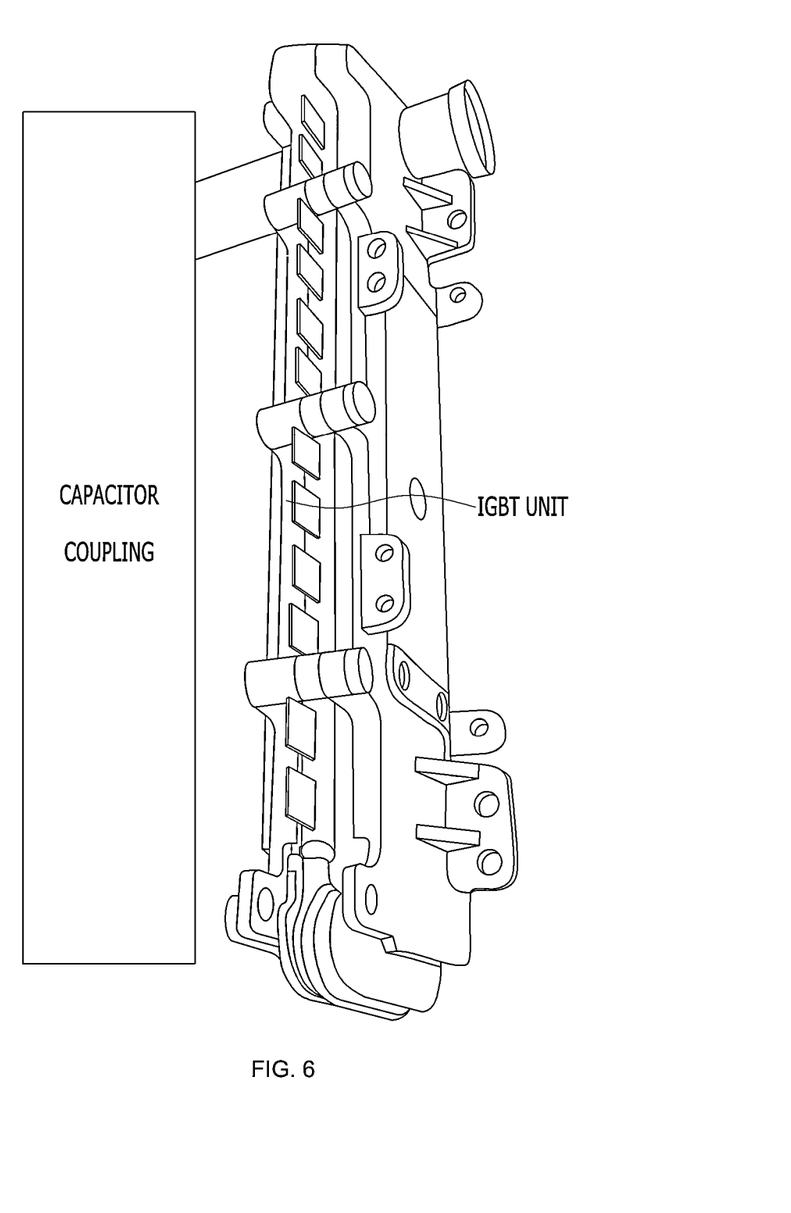
FIG. 6 is a use state view of the case molding capacitor having an improved horizontal degree of the present disclosure.
Figure 7:
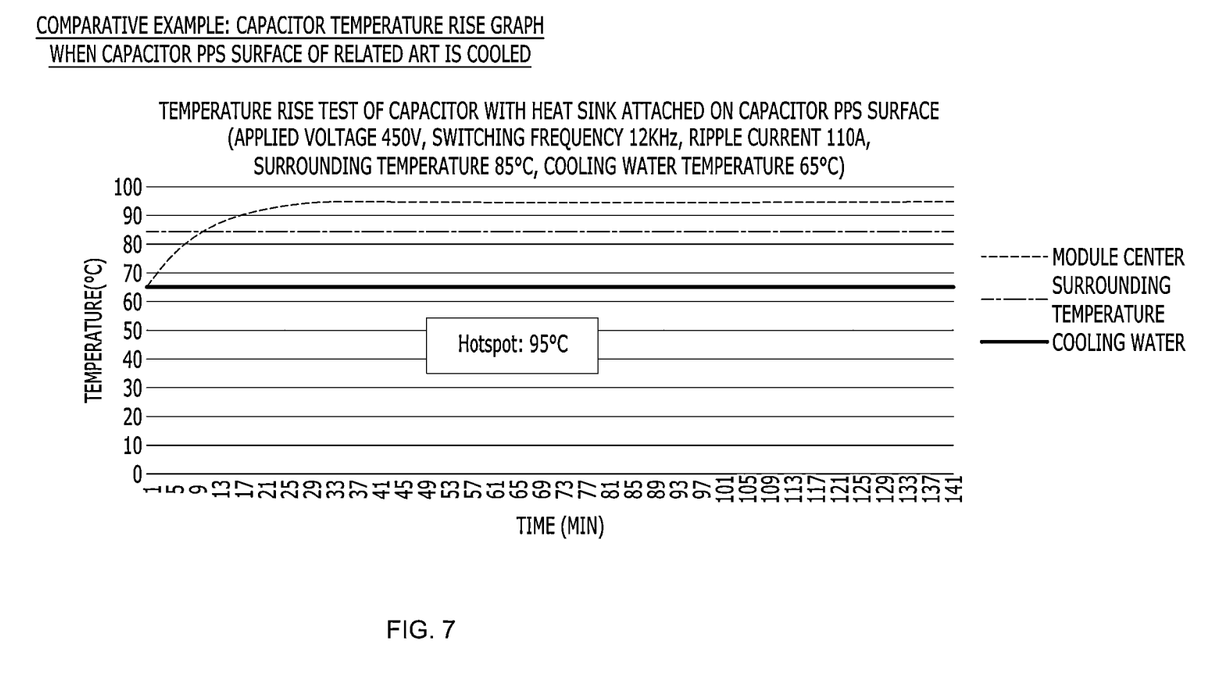
FIGS. 7, 8, and 9 are performance test graphs of the case molding capacitor having an improved horizontal degree of the present disclosure.
Figure 8:
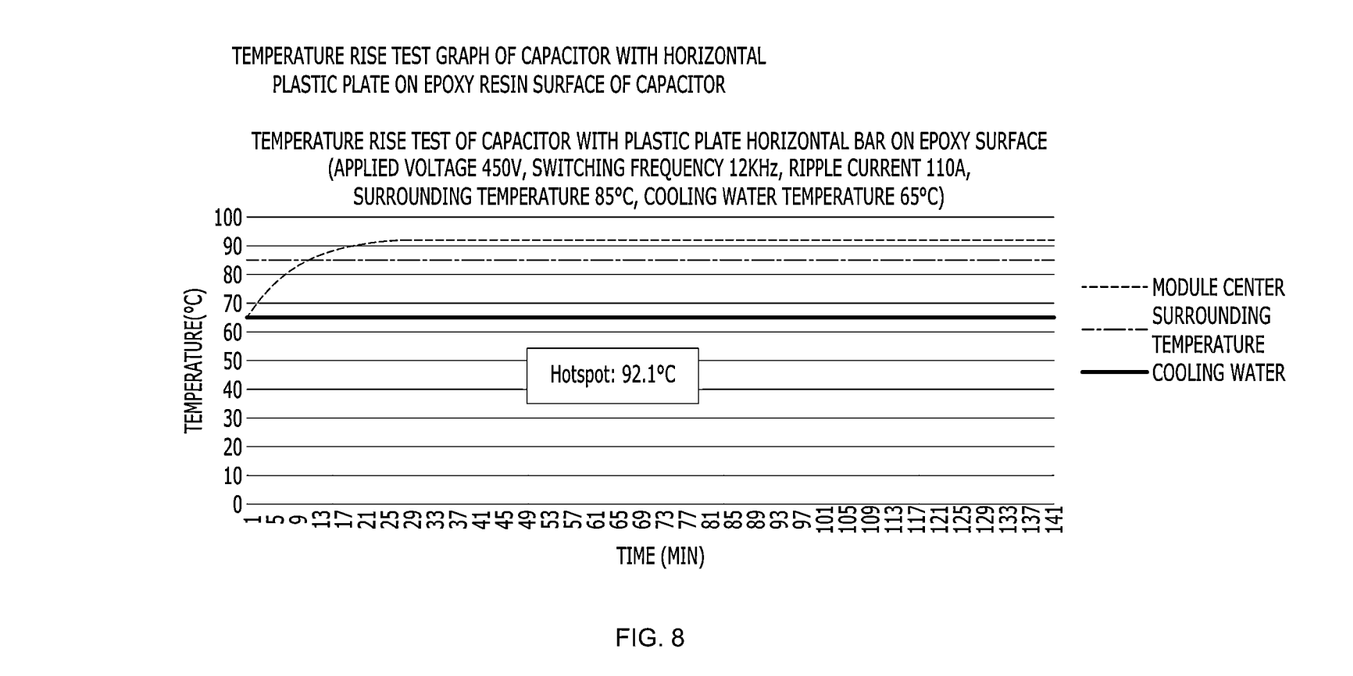
Figure 9:
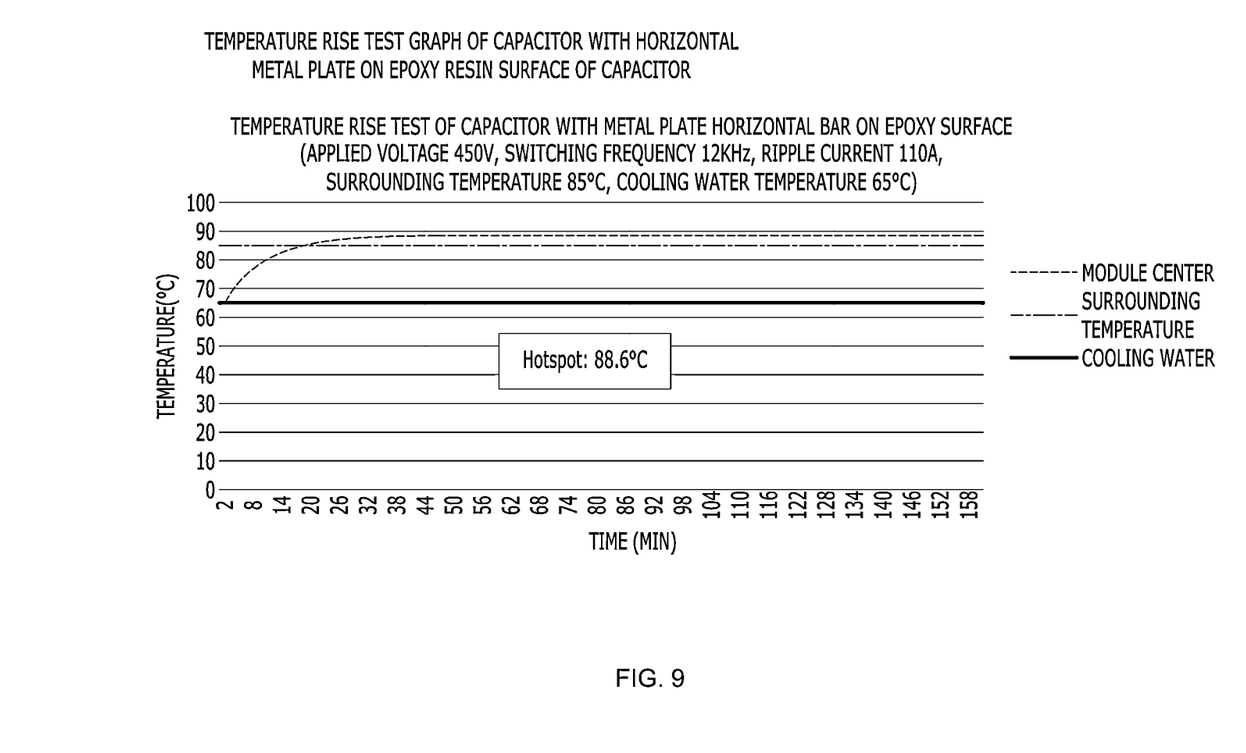

Hereafter, a case molding capacitor having an improved horizontal degree of the present disclosure is described in detail with reference to the accompanying drawings. FIG. 1 is an assembly state view of a case molding capacitor having an improved horizontal degree according to an embodiment of the present disclosure, FIG. 2 is an exploded state view of the case molding capacitor having an improved horizontal degree of the present disclosure, FIG. 3 is a rear perspective view of a horizontal plate part of the case molding capacitor having an improved horizontal degree of the present disclosure, FIG. 4 is a cross-sectional structural view of the horizontal plate part of the case molding capacitor having an improved horizontal degree of the present disclosure, FIG. 5 is a rear perspective view of the case molding capacitor having an improved horizontal degree of the present disclosure (busbar extension assembly view), FIG. 6 is a use state view of the case molding capacitor having an improved horizontal degree of the present disclosure, and FIGS. 7, 8, and 9 are performance test graphs of the case molding capacitor having an improved horizontal degree of the present disclosure.

As shown in FIGS. 1 to 6, a case molding capacitor having an improved horizontal degree of the present disclosure includes a plastic case 10, a capacitor module 20, a filler 30, and a horizontal plate part 40.

Figure 2A:
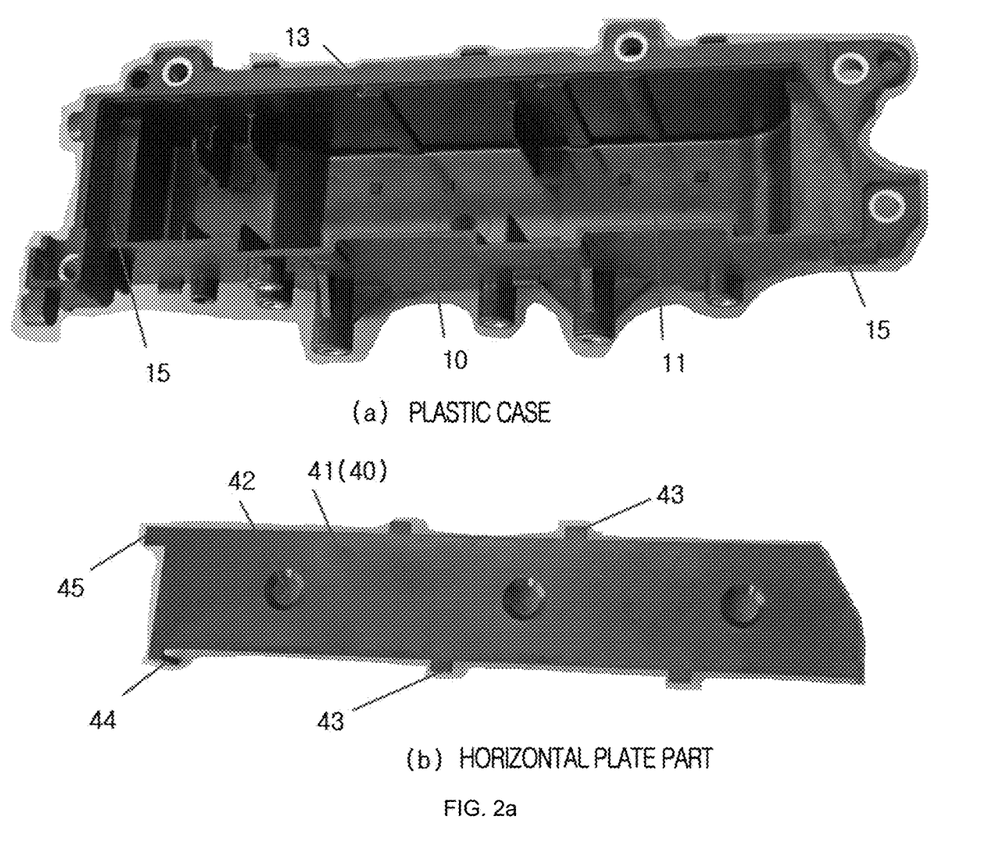
FIGS. 2a and 2b are an exploded state view of the case molding capacitor having an improved horizontal degree of the present disclosure.
Figure 2B:
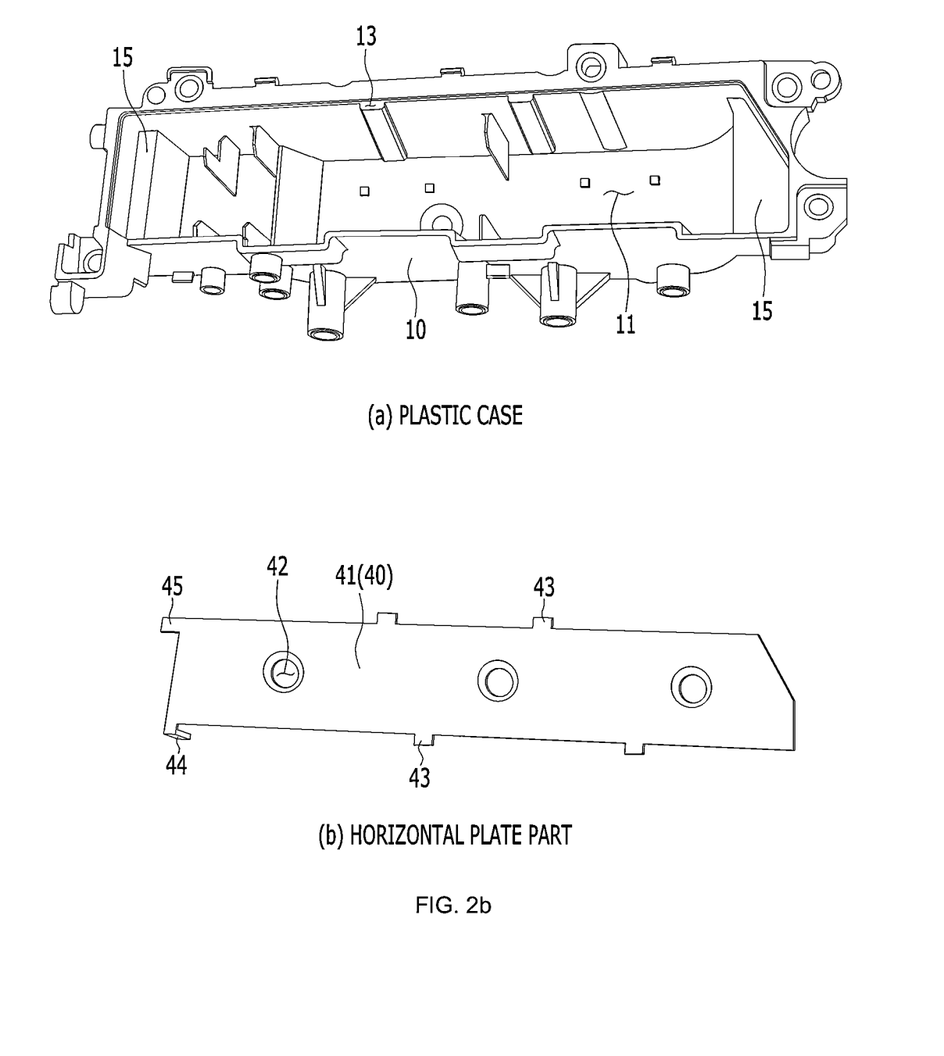

As shown in FIGS. 1 and 2, the plastic case 10 of the present disclosure has an accommodation chamber formed by four sides and a bottom to accommodate the capacitor module, and has an open side 11 on the top for filling a molding agent.

As shown in FIG. 1, the capacitor module 20 includes: a capacitor device C formed by winding a dielectric film and having thermally-sprayed surfaces on both sides, a first busbar electrically connected with a thermally-sprayed surface of the capacitor device and having a first lead terminal 1 on an exposed side, a second busbar electrically connected with the other thermally-sprayed surface of the capacitor device C and having a second lead terminal 2 on an exposed side, and an insulating sheet disposed between the first busbar and the second busbar to insulate an overlap region, and is accommodated in the accommodation chamber of the plastic case 10

As shown in FIG. 1, the filler 30 permeates in a gel or fluid state into the space between the capacitor module 20 and the inner walls of the plastic case 10, and is then hardened therein.

As shown in FIGS. 1 to 3, the horizontal plate part 40 is positioned over the capacitor module 20 and the filler 30, has a shape corresponding to the contour of the open side 11, and has a horizontal plate 41 integrated thereto with the bottom pressing the filler 30.

In an embodiment the horizontal plate part 30, as in the figures below, may be a metallic plate part having a metal layer and an insulator. In another embodiment, the horizontal plate part 40 may be a plastic horizontal plate part entirely made of a plastic material. The horizontal plate part 40 includes a plurality of filler inlet grooves 42 increasing a coupling force to a filling portion and having a shape of which the upper portion is larger than the lower portion by hardening a filler in contact with the horizontal plate 41 of the horizontal plate part 40. As shown in FIG. 2, when the filler inlet grooves 41 are formed in the shape of which the upper portion is larger than the lower portion, it is possible to achieve an effect that the horizontal plate part 40 is fixed well by exposed epoxy.

As shown in FIG. 4, it is preferable that the filler inlet grooves 42 of the horizontal plate portion 40 has a continuous expansion shape having a large width W1 at the upper portion and a small width W2 at the lower portion, or a T-shaped stepped expansion shape having a large width at the upper portion and a small width at the lower portion, or an L-shape extending from the lower portion to the upper portion and then bending, or a shape inclined toward upper portion from the lower portion.

As shown in FIGS. 2 and 3, it is preferable that the horizontal plate part 40 further includes a plurality of width gap maintenance protrusions 43 protruding in both directions from both long-sides of the horizontal plate 41, respectively, and the width gap maintenance protrusions 43 are locked in width protrusion seat grooves 13 recessed on the upper portion of the inner side 10a of the plastic case 10, so the horizontal plate part 40 is aligned on the plastic case 10.

As shown in FIGS. 2 and 3, the horizontal plate part 40 further includes a column-shaped stopper 44 so that the horizontal plate 41 maintains a horizontal degree when it is positioned on the plastic case 10, and the length of the column-shaped stopper 44 is determined such that the horizontal plate 41 is horizontally maintained when the column-shaped stopper 44 is supported by an inner supporting portion 15 of the plastic case 10 to correspond to the inner contour of the plastic case 10. It is preferable that at least three~twelve stoppers protrude downward from the horizontal plate 41.

In an embodiment, since width gap maintenance protrusions 43 are locked in the width protrusion seat grooves 13 recessed on the upper portion of the inner side 10a of the plastic case 10 and the column-shaped stopper 44 is supported by the inner supporting portion 15 of the plastic case 10, the horizontal plate 41 is supported at three or more points by the plastic case 10, whereby the horizontal plate 41 is horizontally maintained.

As shown in FIGS. 2 and 3, the horizontal plate part 40 further includes second gap maintenance protrusions 45 protruding in both directions from both short-sides of the horizontal plate 41, respectively, and the second gap maintenance protrusions 45 assist the horizontal plate part 40 to be aligned on the plastic case 10. The horizontal plate part 40 has a first gap 'Gap 1' so that a remaining filler can flow into between the inner side 10a of the plastic case 10 and a contour line 41a of the horizontal plate 41, and it is preferable that the width of the first gap 'Gap 1' is 0.1~5 mm. When the gap is excessively small, it is difficult to insert the horizontal plate bar and bubbles do not easily come out because the filling gap is excessively narrow. When the gap is excessively large, gaps are generated at the left and right of the horizontal plate, so there may be problem that centering is not made well.

As shown in FIG. 5, busbar extensions 4 extending from a first busbar and a second busbar, respectively, are further provided and are fixed to a surface of the plastic case 10. A protrusion insertion hole is formed at the busbar extension 4, a first insertion protrusion 18 is formed on the bottom of the plastic case, and when the first insertion protrusion 18 protrudes through the first protrusion insertion hole of the busbar extension 4, the front end is thermally bonded to be fixed without pulling out.

A second protrusion insertion hole is formed at the front end 4a of the busbar extension 4 and a second insertion protrusion 19 is formed at a fixed portion of the lower end of the plastic case. The second insertion protrusion 19 is seated in the second protrusion insertion hole, so the busbar extension 4 is aligned and fixed at the lower portion of the plastic case 10.

<Manufacturing of Plastic Plate Horizontal Bar>

The thickness of the plastic (PPS, PC, PBT, ABS, PS) horizontal plate 41 was 2~8 mm to be smaller than the longitudinal and transverse inner dimensions of an epoxy resin filling surface of the capacitor for smooth insertion, and columns were formed at longitudinal and transverse four corners so that horizontality is maintained well when the plastic bar is inserted in the case.

8-pi holes were formed at the left, the center, and the right of the transverse side of the plastic horizontal plate 41. The outer diameter of the holes at the side facing the busbar, that is, on the bottom was small as about 8 pi and the outer diameter of the holes on the top was about 12 pi. The holes were formed such that the bottom was small and the top was large so that when epoxy resin flows inside and hardens, the epoxy resin is not pulled out.

The longitudinal surface of the transverse surface of the plastic horizontal plate 41 was made small as about 3-5 mm so that bubbles and epoxy resin go up when epoxy resin is filled, but only a portion is led at the left, center, and right of the transverse and longitudinal surfaces to minimize bias to a side of the transverse and longitudinal surfaces of the plastic horizontal bar such that the gap between the inner side of the case and the outer side of the plastic horizontal bar was made small as about 1~3 mm so that the function of the horizontal bar is maintained even if the plastic bar is biased to a side.

<Manufacturing of Metal (Aluminum, Nonferrous Metal, Steel, Etc.) Plate Horizontal Bar>

Figure 10:
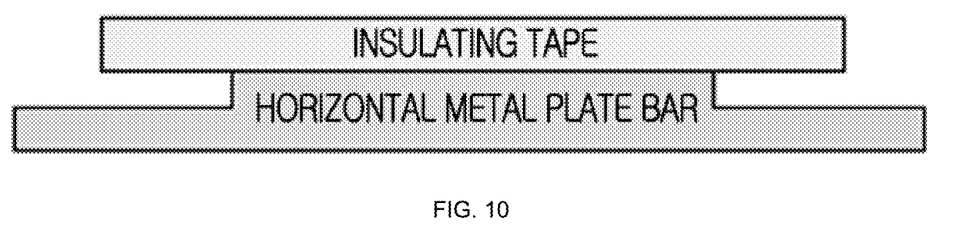

Since the horizontal plate part 40 is made of a metal material and a short circuit is generated when metal and a busbar come in contact with each other, a shape is the same as the plastic horizontal plate, the bottom of the horizontal metal plate was stepped and the stepped protrusions were insulated by attaching an insulate tape (a structure that is insulated when coming in contact with the busbar, see FIG. 10).

<Manufacturing of Injection Plate Capacitor Case>

The width, length, and height were designed sot that a unit composed of a PN-electrode bus bar module can be inserted in the capacitor element thermally-sprayed surface, and positions were designed such that a plastic horizontal bar was horizontally positioned at four transverse and longitudinal corners when the unit composed of a capacitor module was inserted in the case and then the plastic horizontal bar was inserted.

Figure 11:
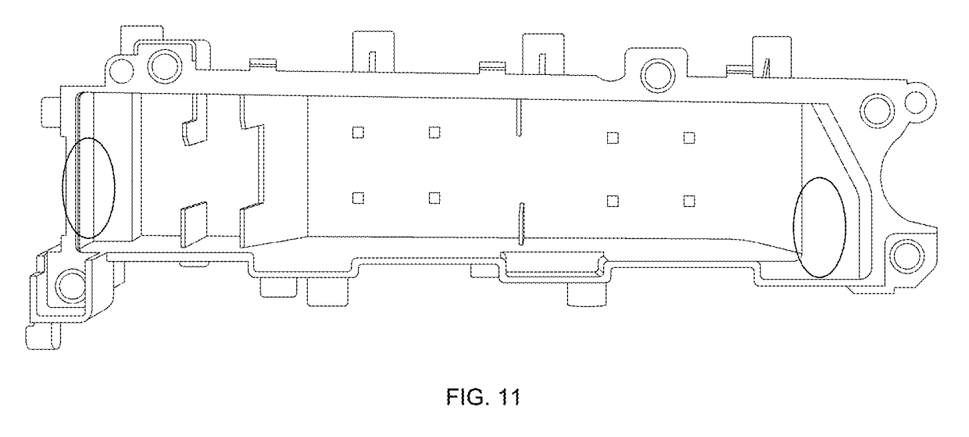

As for four corner columns based on a capacitor mount, the horizontal degrees of a surface of epoxy resin was different, depending on the horizontal degree of a hardening furnace when epoxy resin is hardened, it was designed regardless of the horizontal degree of the hardening furnace when a horizontal plate bar was placed on a horizontal surface (inner supporting portion 15) indicated under the transverse and longitudinal surfaces of a capacitor case (see FIG. 11).

<Fixing by Thermal Bonding>

A capacitor was designed such that a power supply busbar is attached to the front bottom to the rear of the capacitor. A protrusion insertion hole was formed at the busbar extension by forming a hole at a busbar under a hole to prevent separation of the busbar from the hole, and a first insertion protrusion 18 was formed on the bottom of an injection case. When the first insertion protrusion 18 was inserted and protrudes into the first protrusion hole of the busbar extension 4, the front end was fixed by thermal bonding not to be pulled out (thermal bonding is to make a round head by applying heat to protruding plastic). Since thermal bonding was applied, it was not required to use bolts to fix the bus bar, there was an effect of reducing bolts and personnel expenses, the problem that the thickness of a plastic injection product was increased when bolts were used was removed, and there was an effect of decreasing the weight because metal bolts were not used.

A second protrusion insertion hole is formed at the front end 4a of the busbar extension 4 and a second insertion protrusion 19 is formed at a fixed portion of the lower end of the plastic case. The second insertion protrusion 19 is seated in the second protrusion insertion hole, so the busbar extension 4 is aligned and fixed at the lower portion of the plastic case 10.

<Working Method>

A PN-electrode busbar module was configured on a thermally-sprayed surface of a capacitor element, a unit composed of a unit was inserted in a capacitor case, epoxy resin was filled, a metal or plastic plate horizontal bar was brought in contact with the epoxy filling surface, and then the epoxy resin was hardened by pressing down the plastic bar using a jig, and the epoxy resin hardened in close contact with the plastic horizontal bar, whereby the plastic horizontal bar was not pulled out on the epoxy resin surface, and the metal or plastic plate horizontal bar was good within ±0.5 mm. Further, since it was in the epoxy plate hole not to be pulled out after hardening, it was good in terms of all of thermal shock, vibration, and shock tests.

Effect of Invention

As shown in FIGS. 8 and 9, since the metal plate bar pressing the power switch IGBT on the epoxy resin surface of the capacitor manufactured by the present disclosure uniformly pressed a heat sink, the IGBG was cooled well and a temperature rise could be prevented. Further, since the epoxy resin surface having a high thermal transfer coefficient of epoxy resin was cooled in the capacitor, heat generation of the capacitor could be reduced, as follows, and Hotspot temperature was low, so the capacity of the capacitor could be decreased, and accordingly, the volume and the weight could be reduced.

TABLE 1

| Items | Cooling capacitor with heat sink attached to surface of plastic PPS case | Cooling capacitor with plastic plate horizontal bar attached to epoxy resin surface and heat sink attached to plate bar surface | Capacitor with metal plate horizontal bar attached to epoxy resin surface and heat sink attached to plate bar surface | Remark |
|---|---|---|---|---|
| Hotspot temp.(° C.) | 95 | 92.1 | 88.6 | |
| Reduction (based on PPS surface) | Unit: ° C. | −2.9 | −6.4 | −3.5 |

TABLE 2

| Items | Thermal conductivity of plastic PPS (Wm^−1 C^−1) | Thermal conductivity of epoxy resin (Wm^−1 C^−1) | Thermal conductivity of aluminum (Wm^−1 C^−1) | Remark |
|---|---|---|---|---|
| Hotspot temp.(° C.) | 0.359 | 0.6 | 92 | Unit: ° C. |

As the result of a temperature rise test on three kinds of capacitors, there was an advantage that there were differences in temperature rise due to differences in thermal conductivity of the materials, and the product of the plastic plate horizontal bars on the epoxy resin surface was about −2.9° C. low and the product of the metal plate horizontal bars on the epoxy resin surface was about −6.4° C. low, in comparison to the existing methods.

Although the present disclosure was described with reference to the preferable embodiments described above, the scope of the present disclosure is not limited thereto, is determined by the following claims, and may include various changes and modifications in the equivalent range of the present disclosure.

It should be noted that the reference numerals in the following claims are provided only to help understand the present disclosure without influencing construction of the right range and the right range should not be construed narrowly on the basis of the reference numerals.

According to the present disclosure, there is provided a case molding capacitor having an improved horizontal degree in which heat dissipation by direct contact of a filling surface and an IGBT cooling unit can be increased because it is difficult to make the horizontal degree or levelness of an epoxy exposure surface be ±0.5 mm while using the epoxy filling hardening method of the present disclosure.

What is claimed is:

1. A case molding capacitor having an improved horizontal degree, the case molding capacitor comprising:
   a plastic case having an accommodation chamber formed by four sides and a bottom to accommodate the capacitor module, and having an open side on the top for filling a molding agent;
   a capacitor module including a capacitor device formed by winding a dielectric film and having thermally-sprayed surfaces on both sides, a first busbar electrically connected with a thermally-sprayed surface of the capacitor device and having a first lead terminal on an exposed side, a second busbar electrically connected with the other thermally-sprayed surface of the capacitor device and having a second lead terminal on an exposed side, and an insulating sheet disposed between the first busbar and the second busbar to insulate an overlap region, and being accommodated in the accommodation chamber of the plastic case;
   a filler permeating in a gel or fluid state into the space between the capacitor module and inner walls of the plastic case, and then hardened therein, thereby filling up the space; and
   a horizontal plate part positioned over the capacitor module and the filler, has a shape corresponding to the contour of the open side, and has a horizontal plate integrated thereto with the bottom pressing the filler, wherein the horizontal plate part is a metallic plate part having a metal layer and an insulator or a plastic horizontal plate part entirely made of a plastic material, and
   the horizontal plate part includes a plurality of filler inlet grooves increasing a coupling force to a filling portion by hardening a filler in contact with the horizontal plate of the horizontal plate part.

2. The case molding capacitor of claim 1, wherein the filler inlet grooves of the horizontal plate portion has a continuous expansion shape having a large width at the upper portion and a small width at the lower portion, or a T-shaped stepped expansion shape having a large width at the upper portion and a small width at the lower portion, or an L-shape extending from the lower portion to the upper portion and then bending, or a shape inclined toward upper portion from the lower portion.

3. The case molding capacitor of claim 2, wherein the horizontal plate part further includes a plurality of width gap maintenance protrusions protruding in both directions from both long-sides of the horizontal plate, respectively, and the width gap maintenance protrusions are locked in width protrusion seat grooves recessed on the upper portion of the inner side of the plastic case, so the horizontal plate part is horizontally aligned on the plastic case.

4. The case molding capacitor of claim 2, wherein
the horizontal plate part further includes a column-shaped stopper so that the horizontal plate maintains a horizontal degree when it is positioned on the plastic case,
the length of the column-shaped stopper is determined such that the horizontal plate is horizontally positioned when the column-shaped stopper is supported by an inner supporting portion of the plastic case to correspond to the inner contour of the plastic case, and
at least three-twelve stoppers protrude downward from the horizontal plate.

5. The case molding capacitor of claim 3, wherein width gap maintenance protrusions are locked in the width protrusion seat grooves recessed on the upper portion of the inner side of the plastic case, the column-shaped stopper is supported by the inner supporting portion of the plastic case, and
the horizontal plate is supported at three or more points by the plastic case, whereby the horizontal plate is horizontally maintained.

6. The case molding capacitor of claim 3, wherein the horizontal plate part further includes second gap maintenance protrusions protruding in both directions from both short-sides of the horizontal plate, respectively,
the second gap maintenance protrusions assist the horizontal plate part to be aligned on the plastic case,
the horizontal plate part has a first gap so that a remaining filler can flow into between the inner side of the plastic case and a contour line of the horizontal plate, and the width of the first gap (Gap 1)' is 0.1 - 5mm.

7. The case molding capacitor of claim 1, wherein busbar extensions extending from a first busbar and a second busbar, respectively, are further provided and are fixed to a surface of the plastic case,
a protrusion insertion hole is formed at the busbar extension, a first insertion protrusion is formed on the bottom of the plastic case, and when the first insertion protrusion protrudes through the first protrusion insertion hole of the busbar extension, the front end is thermally bonded to be fixed without pulling, and
a second protrusion insertion hole is formed at the front end of the busbar extension, a second insertion protrusion is formed at a fixed portion of the lower end of the plastic case, and the second insertion protrusion is seated in the second protrusion insertion hole, so the busbar extension is aligned and fixed at the lower portion of the plastic case.

8. The case molding capacitor of claim 4, wherein width gap maintenance protrusions are locked in the width protrusion seat grooves recessed on the upper portion of the inner side of the plastic case, the column-shaped stopper is supported by the inner supporting portion of the plastic case, and
the horizontal plate is supported at three or more points by the plastic case, whereby the horizontal plate is horizontally maintained.

* * * * *